(12) United States Patent
Roychoudhury et al.

(10) Patent No.: US 10,787,959 B2
(45) Date of Patent: Sep. 29, 2020

(54) OPERATION OF INTERNAL COMBUSTION ENGINE WITH IMPROVED FUEL EFFICIENCY

(71) Applicant: PRECISION COMBUSTION, INC., North Haven, CT (US)

(72) Inventors: Subir Roychoudhury, Madison, CT (US); Richard Mastanduno, Milford, CT (US); Eric Edward Allocco, Cheshire, CT (US); Saurabh Vilekar, Woodbridge, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 0 days.

(21) Appl. No.: 16/463,409

(22) PCT Filed: Dec. 6, 2017

(86) PCT No.: PCT/US2017/000090
§ 371 (c)(1),
(2) Date: May 23, 2019

(87) PCT Pub. No.: WO2018/118100
PCT Pub. Date: Jun. 28, 2018

(65) Prior Publication Data
US 2020/0131984 A1    Apr. 30, 2020

Related U.S. Application Data

(60) Provisional application No. 62/437,098, filed on Dec. 21, 2016.

(51) Int. Cl.
*F02B 51/02* (2006.01)
*F02M 27/02* (2006.01)
(Continued)

(52) U.S. Cl.
CPC .............. *F02B 51/02* (2013.01); *B01J 23/464* (2013.01); *B01J 35/06* (2013.01); *C01B 3/386* (2013.01);
(Continued)

(58) Field of Classification Search
CPC .......... F02B 51/02; F02B 43/12; F02B 47/06; F02M 26/36; F02M 27/02; B01J 23/464;
(Continued)

(56) References Cited

U.S. PATENT DOCUMENTS 3,915,125 A    10/1975    Henkel
4,033,133 A    7/1977    Houseman
(Continued)

FOREIGN PATENT DOCUMENTS

JP     2005083210 B2    3/2005
WO    WO2004060546 A2    7/2004

OTHER PUBLICATIONS

S. Roychoudhury, R. Mastanduno, D. Spence, B. Crowder, C. Morgan, "Spark-Ignited Internal Combustion Engine Modified for Multi-Fuel Operation", co-pending U.S. Appl. No. 16/015,305, filed Jun. 22, 2018.
(Continued)

*Primary Examiner* — Jacob M Amick
(74) *Attorney, Agent, or Firm* — Marie F. Zuckerman

(57) ABSTRACT

A process of operating a spark-ignited internal combustion engine (SI-ICE) with improved fuel efficiency and reduced emissions including under steady state and under lean-operating conditions at high overall air to fuel (AFR) ratios. A first supply of high octane hydrocarbon fuel, such as gasoline or natural gas, and a first supply of oxidant are fed to a fuel reformer to produce a gaseous reformate with a reforming efficiency of greater than 75 percent relative to equilibrium. The gaseous reformate is mixed with a second
(Continued)

supply of oxidant, after which the resulting reformate blended oxidant is fed with a second supply of high octane hydrocarbon fuel to the SI-ICE for combustion. Steady state fuel efficiency is improved by more than 3 percent, when the reformate comprises from greater than about 1 to less than about 18 percent of the total volume of reformate blended oxidant fed to the engine.

26 Claims, 7 Drawing Sheets

(51) Int. Cl.
    *C01B 3/38*     (2006.01)
    *C10L 1/02*     (2006.01)
    *F02M 26/36*     (2016.01)
    *B01J 23/46*     (2006.01)
    *B01J 35/06*     (2006.01)
    *C10L 1/12*     (2006.01)
    *C10L 10/02*     (2006.01)
    *F02B 43/12*     (2006.01)
    *F02B 47/06*     (2006.01)
    *F02B 43/10*     (2006.01)

(52) U.S. Cl.
CPC .............. *C01B 3/388* (2013.01); *C10L 1/023* (2013.01); *C10L 1/12* (2013.01); *C10L 1/1233* (2013.01); *C10L 10/02* (2013.01); *F02B 43/12* (2013.01); *F02B 47/06* (2013.01); *F02M 26/36* (2016.02); *F02M 27/02* (2013.01); C01B 2203/0261 (2013.01); C01B 2203/1064 (2013.01); C01B 2203/1247 (2013.01); C10L 2200/0277 (2013.01); C10L 2200/0281 (2013.01); C10L 2200/0423 (2013.01); C10L 2230/22 (2013.01); C10L 2270/023 (2013.01); F02B 2043/103 (2013.01)

(58) Field of Classification Search
CPC .......... B01J 35/06; C01B 3/386; C01B 3/388; C10L 1/023; C10L 1/12; C10L 1/1233; C10L 10/02
See application file for complete search history.

(56) References Cited

U.S. PATENT DOCUMENTS

| | | | |
|---|---|---|---|
| 4,109,461 A | 8/1978 | Fujitani | |
| 4,131,086 A | 12/1978 | Noguchi | |
| 4,131,095 A | 12/1978 | Ouchi | |
| 4,350,133 A | 9/1982 | Greiner | |
| 5,051,241 A | 9/1991 | Pfefferle | |
| 5,947,063 A | 9/1999 | Smith | |
| 6,083,425 A * | 7/2000 | Clawson | B01J 8/0278 252/372 |
| 6,156,444 A | 12/2000 | Smith | |
| 6,328,936 B1 | 12/2001 | Roychoudhury | |
| 7,141,092 B1 | 11/2006 | Roychoudhury | |
| 7,174,861 B2 | 2/2007 | Allston | |
| 7,504,047 B2 | 3/2009 | Castaldi | |
| 7,976,594 B2 | 7/2011 | Roychoudhury | |
| 8,439,990 B2 | 5/2013 | Roychoudhury | |
| 8,557,189 B2 | 10/2013 | Roychoudhury | |
| 8,795,398 B2 | 8/2014 | Roychoudhury | |
| 10,060,344 B1 | 8/2018 | Roychoudhury | |
| 2003/0162062 A1 * | 8/2003 | Hoenig | H01M 8/04223 429/425 |
| 2004/0099226 A1 | 5/2004 | Bromberg | |
| 2004/0144337 A1 | 7/2004 | Wakao | |
| 2007/0183939 A1 | 8/2007 | Hotta | |
| 2008/0010993 A1 | 1/2008 | Morgenstern | |
| 2009/0252661 A1 | 10/2009 | Roychoudhury | |
| 2010/0012090 A1 | 1/2010 | Lewis, III | |
| 2011/0061299 A1 | 3/2011 | Roychoudhury | |
| 2013/0312384 A1 | 11/2013 | Hwang | |
| 2014/0109853 A1 | 4/2014 | Gruber | |
| 2014/0196702 A1 | 7/2014 | Gingrich | |
| 2015/0107538 A1 | 4/2015 | Sall | |
| 2016/0341117 A1 | 11/2016 | Ekstrom | |

OTHER PUBLICATIONS

FTWI Yohaness Hagos, A. Rashid A. Aziz, and Shaharin Anwar Sulaiman, "Trends of Syngas as a Fuel in Internal Combustion Engines", Advances in Mechanical Engineering, Hindawi Publishing Company, vol. 2014, Article ID 401587, 10 pages.

Hoehn, F. W. and Dowdy, M.W., "Feasibility Demonstration of a Road Vehicle Fueled with Hydrogen-Enriched Gasoline", NASA Technical Reports Server (NTRS), Document ID: 19750026502, Jan. 1, 1974; Intersociety Energy Conversion Engineering Conference: 9th, Aug. 26-30, 1974, San Francisco, CA.

* cited by examiner

OPERATION OF INTERNAL COMBUSTION ENGINE WITH IMPROVED FUEL EFFICIENCY

CROSS REFERENCE TO RELATED APPLICATIONS

This application is a 371 filing of International Patent Application PCT/US2017/000090, filed Dec. 6, 2017, which claims the benefit of U.S. provisional patent application No. 62/437,098, filed Dec. 21, 2016, which is incorporated in its entirety herein by reference.

GOVERNMENT RIGHTS

This invention was made with support from the U.S. government under Contract no. DE-SC0013709, sponsored by the Department of Energy (DOE). The U.S. Government holds certain rights in this invention.

FIELD OF THE INVENTION

This invention pertains to a process of operating a spark-ignited internal combustion engine with improved fuel efficiency and reduced emissions.

BACKGROUND OF THE INVENTION

Spark-ignited internal combustion engines (SI-ICE) are designed to operate on a high octane hydrocarbon fuel, typically gasoline having an average octane number greater than 80. To review basic operation of a four-stroke engine, in a first step the hydrocarbon fuel is injected into a chamber comprising a reciprocating piston, where the fuel is mixed with an oxidant, typically oxygen supplied as air. In a second step, the piston moves to compress the mixture. In a third step, the compressed mixture is spark ignited (SI) whereupon combustion occurs to produce an expanding mixture of gaseous combustion products. The gaseous products produce a force on the piston that moves the piston over a distance. Mechanical energy derived from the moving piston is converted into useful mechanical work, such as rotational work by means of a connecting rod and crankshaft, or useful electrical work by means of a generator. After maximum expansion, the piston retracts as the gases exit the chamber; and thereafter the process is repeated many times. In the SI-ICE combustion is intermittent.

Such engines find utility in motive applications that are the predominant power supply for cars, buses, motorcycles, boats and small gasoline-powered engines, such as lawn mowers. Such engines also find utility in electrical power generators, which are used in logistics and rescue operations (i.e., field operations) and used for temporary power generation during disruptions in a power grid.

The prior art discloses adding hydrogen to gasoline powered IC engines. It is recognized that flame speed and flame stability may be enhanced under lean conditions at high air to fuel ratios (AFR) when hydrogen is added to the gasoline fuel. It is also taught that hydrocarbons emissions may be reduced with addition of hydrogen to gasoline; whereas in contrast, nitrogen oxide (NOx) emissions unacceptably increase. The art also recognizes that power output of an IC engine disadvantageously decreases with increasing volumetric augmentation with hydrogen or other gaseous fuel additive, because the gaseous augmentation additive has a lower energy density as compared with the hydrocarbon fuel.

References disclosing the effects of adding hydrogen to gasoline in fueling a spark-ignited internal combustion engine include the following publications: "Experimental Investigation of the Effect of Hydrogen Addition on Combustion Performance and Emissions Characteristics of a Spark Ignition High Speed Gasoline Engine," by K. V. Shivaprasad, et al., Procedia Technology, Vol. 14, 2014, pp. 141-148; "Hydrogen Addition on Combustion and Emission Characteristics of High Speed Spark Ignition Engine—An Experimental Study," K. V. Shivaprasad, et al., SAE International Publication No. 2015-01-1684, Apr. 4, 2015; and "Feasibility Demonstration of a Road Vehicle Fueled with Hydrogen-Enriched Gasoline," by F. W. Heohn and M. W. Dowdy, Proceedings of the Intersociety Energy Conversion Engineering Conference, $9^{th}$, Aug. 26-30, 1974, San Francisco, Calif.

If hydrogen is used to augment a hydrocarbon fuel, a supply of hydrogen is required. The art proposes that hydrogen can be supplied either through an on-board pressurized storage cylinder, or an on-board water electrolysis unit, or an on-board fuel reformer that converts the liquid fuel into hydrogen. Neither the pressurized storage cylinder nor the electrolysis unit is practical. The pressurized cylinder adds weight; moreover, a hydrogen supply network for repressurizing the cylinder is not readily available. The water electrolysis unit requires an on-board supply of water; and electrolysis units disadvantageously require a complex apparatus of electrodes and electrolytes and significant amounts of electrical power. The fuel reformer is thought to be a potentially feasible technology for on-board generation of hydrogen.

The prior art discloses a process of operating a spark-ignited internal combustion engine on a gaseous reformate comprising hydrogen and carbon monoxide. U.S. Pat. Nos. 4,131,095 and 7,174,861, for example, disclose an IC engine operating on reformate produced through reformation of a liquid fuel typified by gasoline. The reformer is taught to be used during start-up, but not during steady-state operation due to loss in fuel efficiency and power output; therefore, any potential benefit from the reformer is accrued only during start-up to reduce cold-start emissions.

Prior art reformers tend to exhibit unacceptable reforming efficiency leading to disadvantages in augmenting the SI-ICE with gaseous hydrogen or reformate. As noted hereinabove, gaseous hydrogen has a lower energy density compared with that of the hydrocarbon fuel. Consequently, the greater the volume of hydrogen added to engine combustion chamber(s), the lower will be the power output of the engine. The overall benefits of adding hydrogen to the system should outweigh the loss of fuel efficiency due to volumetric considerations. Thus, in order to employ a reformer during steady state operation of the engine, a ratio of hydrogen yield relative to the quantity of hydrocarbon fuel diverted from the IC engine to the reformer should be increased so as to obtain overall system benefits.

It should also be appreciated that a presence of unconverted hydrocarbons and partially oxidized chemical products, including carbon monoxide, in the reformate changes the fuel composition and combustion characteristics within the IC engine. Accordingly, for augmentation during steady state operation, the composition of the reformate should be dependable and substantially consistent throughout operation. Moreover, the performance of prior art reformers tends to degrade quickly producing coke and decreasing hydrogen yield. Coke degrades a reforming catalyst and damages the IC engine. Thus despite years of research, no practical beneficial implementation has been made of a process of improving the fuel efficiency of a spark-ignited internal combustion engine, particularly during steady state operation, by augmenting a high octane fuel with hydrogen generated by an on-board fuel reformer.

As spark-ignited internal combustion engines continue to be operated on a high octane hydrocarbon fuel, improvements in fuel efficiency and engine performance remain increasingly important, especially as demands for energy and transportation increase and targets for allowable emissions decrease. From this perspective, the art would benefit from discovery of a process of operating a spark-ignited internal combustion engine with improved performance and improved fuel efficiency and power output, especially under steady state operating conditions. Indicators of improved performance and fuel efficiency include increased hydrogen yield and reformate utilization relative to hydrocarbon fuel diverted from the engine to the reformer, increased combustion stability, reduced fuel consumption without loss in power output, reduced knock, and consistent reductions in emissions of hydrocarbons, carbon monoxide, and nitrogen oxides (NOx).

SUMMARY OF THE INVENTION

We have now discovered a novel process of operating a spark-ignited internal combustion engine with improved fuel efficiency and lower emissions. The novel process of this invention comprises:

(a) contacting a first supply of high octane hydrocarbon fuel and a first supply of oxidant with a reforming catalyst in a catalytic reaction zone of a fuel reformer, the contacting being conducted under partial oxidation reaction conditions sufficient to produce a gaseous reformate comprising hydrogen and carbon monoxide with a reforming efficiency greater than about 75 percent relative to equilibrium;

(b) mixing the gaseous reformate with a second supply of oxidant to form a reformate blended oxidant, wherein the reformate comprises from greater than about 1 to less than about 18 volume percent of the total volume of the reformate blended oxidant; and (c) feeding the reformate blended oxidant and a second supply of high octane hydrocarbon fuel into the spark-ignited internal combustion engine, and igniting the resulting mixture thereof under combustion conditions.

The novel process of this invention provides for conversion of a first supply of high octane hydrocarbon fuel and a first supply of oxidant into a gaseous reformate with a reforming efficiency greater than about 75 percent relative to equilibrium, as defined hereinafter. The gaseous reformate consistently comprises a mixture of hydrogen and carbon monoxide with little, if any, unconverted hydrocarbons and coke. The gaseous reformate is produced at high throughput, in real time, at a constant or varying output based upon control strategy and operational requirements. The reformer itself comprises a compact, light-weight and high throughput apparatus that readily adapts to on-board integration with the SI-IC engine.

The gaseous reformate produced as described herein is mixed with a second supply of oxidant, such as intake air, to form a gaseous mixture comprising the reformate and the second supply of oxidant, hereinafter referred to as the "reformate blended oxidant". Then, the reformate blended oxidant is fed into the spark-ignited internal combustion engine along with a second supply of high octane hydrocarbon fuel, where combustion occurs with improved fuel efficiency and across-the-board engine performance. In particular, with reformate augmentation, the fuel efficiency increases as evidenced by a decrease in Indicated Specific Fuel Consumption (ISFC), defined as fuel flow rate per unit power output (g/kW-hr). With the process of this invention improvements are also found in increased combustion stability, reduced knock, and expanded operation under lean air to fuel ratios (AFR), which for purposes of this invention refer to an overall system AFR greater than about 18:1. In addition, reductions in hydrocarbons and carbon monoxide emissions are found. More surprisingly, a reduction in NOx emissions is found consistently over a broad range of operating conditions. Advantageously, the aforementioned benefits accrue at low volumetric reformate augmentation, specifically, at an augmentation of greater than about 1 to less than about 18 volume percent reformate, calculated on the total volume of the reformate blended oxidant, i.e., the total volume of reformate and second supply of oxidant fed to the engine. This low volume of reformate augmentation beneficially conserves the power output of the engine and allows for improved operation not only during cold engine start-up but more beneficially throughout steady state operation. The combined attributes of this process provide for a unique practical solution to the problems heretofore associated with integrating an on-board fuel reformer with a spark-ignited internal combustion engine.

DRAWINGS

Figure 5:
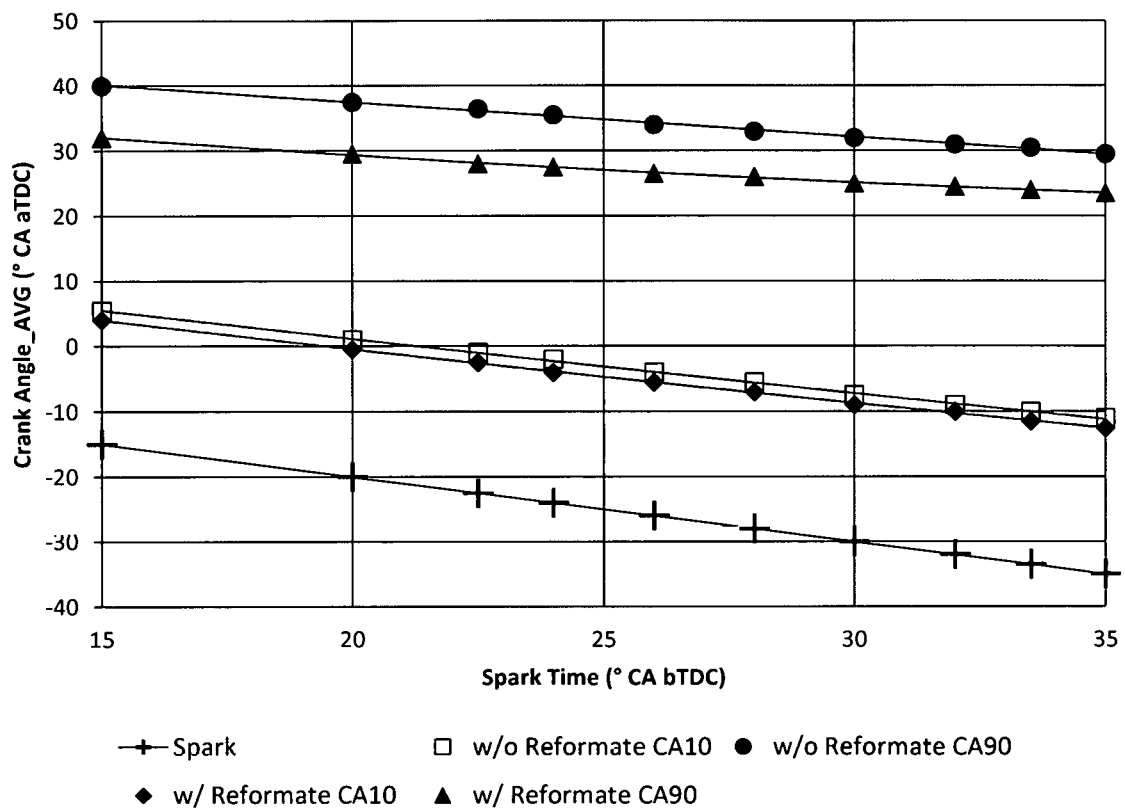

FIG. 5 depicts three curves for an embodiment of the process of this invention: a bottom curve depicting Spark Time expressed as Crank Angle after Top Dead Center (° CA aTDC), a middle curve depicting Crank Angle (CA10) at which 10% of the fuel charge was burned, and a top curve depicting Crank Angle (CA90) at which 90% of the fuel charge was burned, each curve plotted as a function of Spark Time expressed as Crank Angle before Top Dead Center (° CA bTDC).

Figure 6:
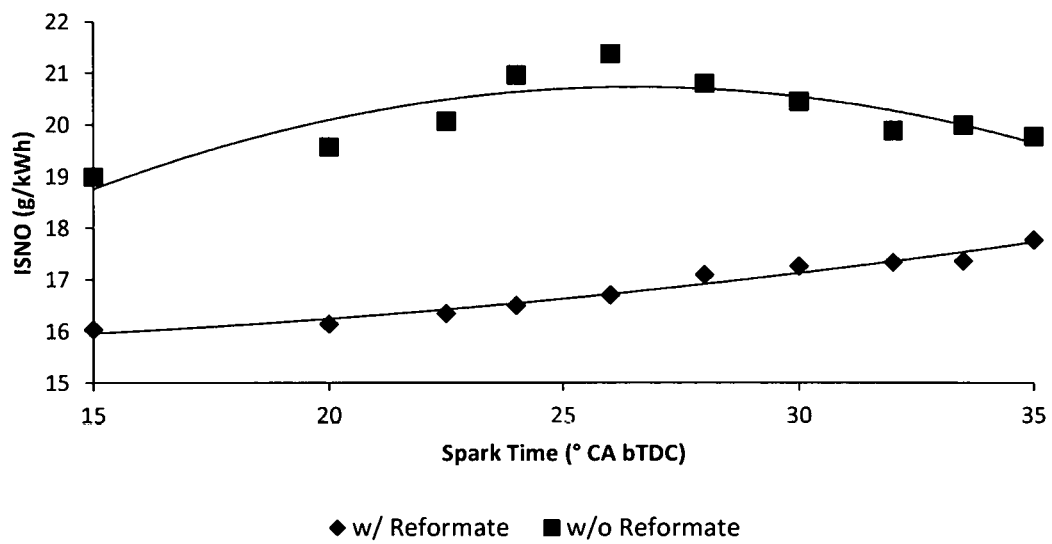

FIG. 6 depicts a graph of Indicated Specific Nitrogen Oxide emissions (ISNO) as a function of Spark Time, expressed as Crank Angle before Top Dead Center (° CA bTDC), for an embodiment of the process of this invention.

Figure 7:
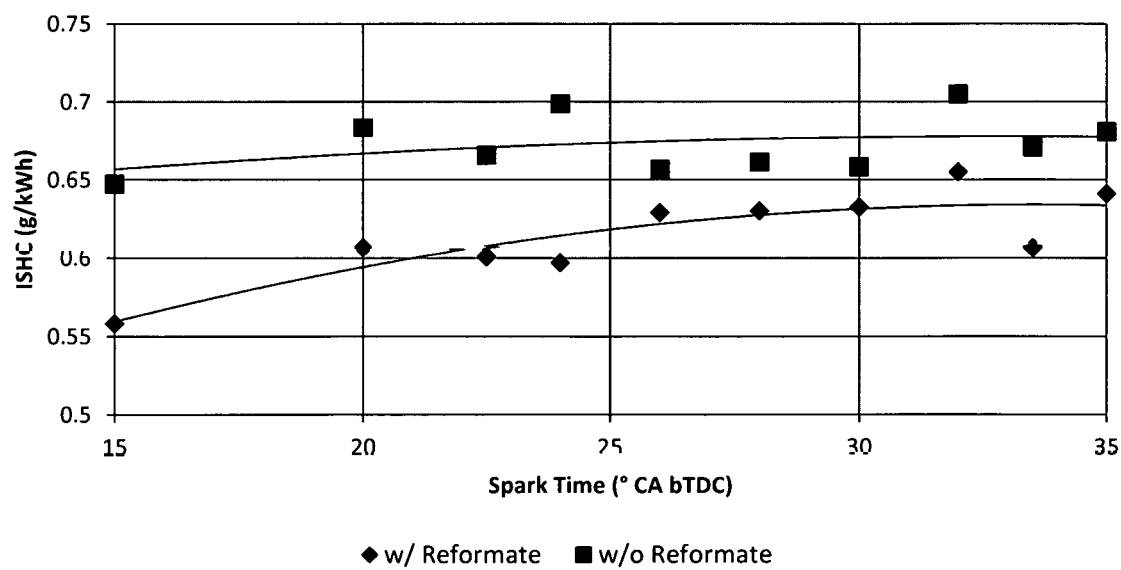

FIG. 7 depicts a graph of Indicated Specific Hydrocarbons emissions (ISHC) as a function of Spark Time, expressed as Crank Angle before Top Dead Center (° CA bTDC), for an embodiment of the process of this invention.

Figure 8:
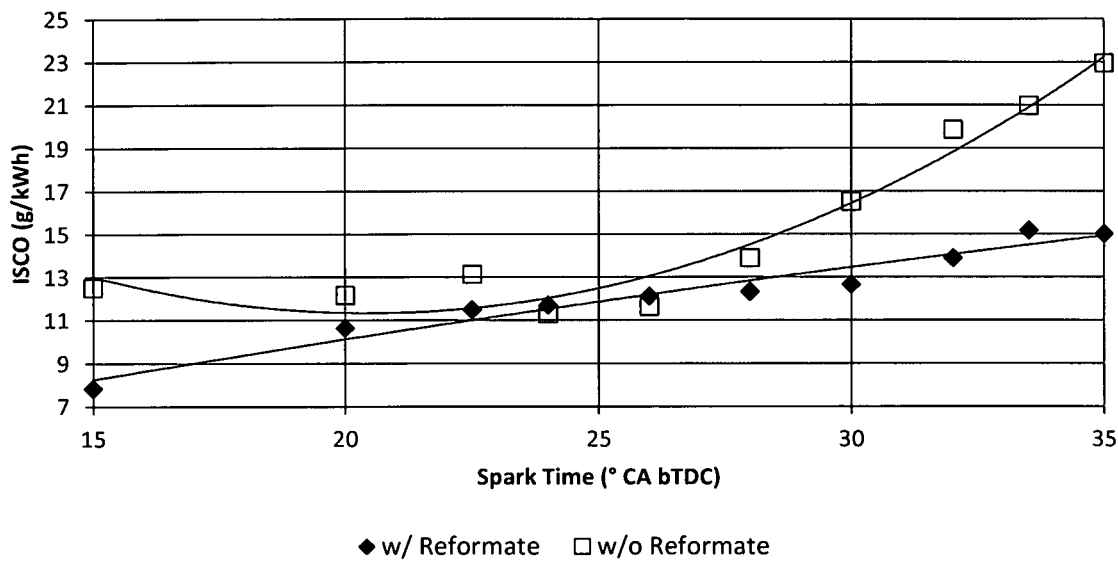

FIG. 8 depicts a graph of Indicated Specific Carbon Monoxide emissions (ISCO) as a function of Spark Time, expressed as Crank Angle before Top Dead Center (° CA bTDC), for an embodiment of the process of this invention.

Figure 9:
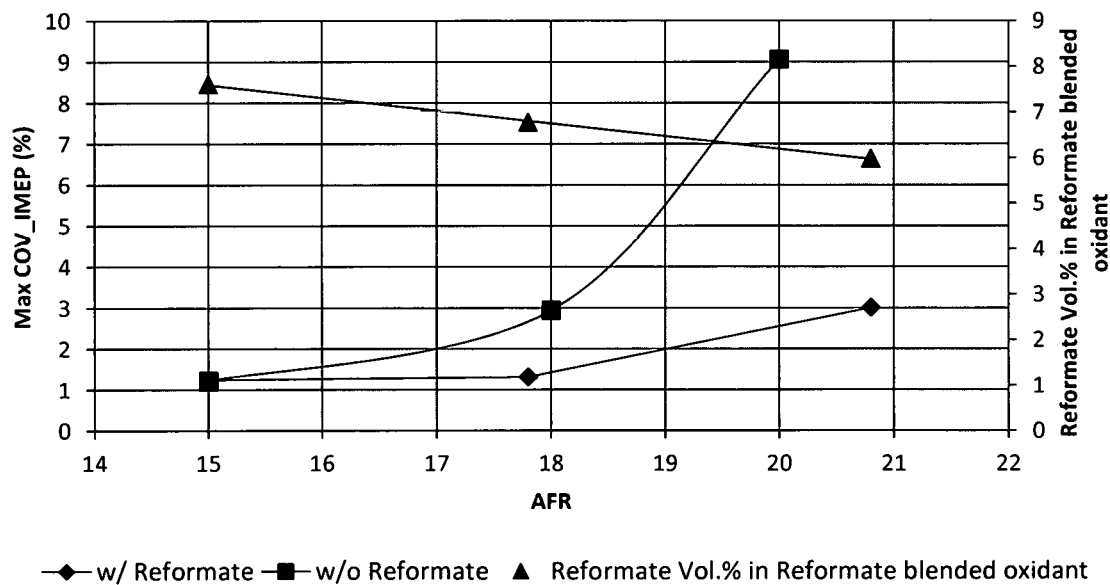

FIG. 9 depicts one graph of Maximum Coefficient of Variation of Indicated Mean Effective Engine Pressure (CoV of IMEP) as a function of Air to Fuel Ratio (AFR) and another graph of Reformate Volume (%) in Reformate Blended Oxidant as a function of AFR, for an embodiment of the process of this invention.

For comparative purposes, each of FIGS. 2-9 further depicts a similar graph of a comparative embodiment wherein the SI-ICE is operated without reformate augmentation.

DETAILED DESCRIPTION OF THE INVENTION

In the novel process of this invention, a spark-ignited internal combustion engine is operated on a hydrocarbon fuel augmented with a gaseous reformate produced in a high efficiency fuel reformer. In the reformer a catalytic partial oxidation process (CPDX) occurs such that a first supply of hydrocarbon fuel of high octane number is contacted with a first supply of oxidant in the presence of a reforming catalyst under CPDX conditions sufficient to convert the hydrocarbon fuel into a gaseous reformate comprising hydrogen and carbon monoxide. Acceptably small quantities of carbon dioxide and water are also produced. Unconverted hydrocarbons are produced in small quantity of less than about 5,000 parts per million by volume (ppmv), preferably, less than about 1,000 ppmv. The reformer is capable of converting the hydrocarbon fuel into the gaseous reformate with a reforming efficiency greater than about 75 percent relative to equilibrium.

For purposes of this invention, the term "reforming efficiency," referring to the efficiency of the reformer, is defined as a ratio, expressed as a percentage, of a total Lower Heating Value (LHV) of the gaseous reformate actually obtained (i.e., sum of the LHV's of all gaseous components identified in the reformate including hydrogen, carbon monoxide, and unconverted fuel) as compared with a total LHV of the gaseous reformate calculated at equilibrium for the specific fuel and selected CPDX conditions, including a temperature and reformer air to fuel ratio (O:C) as defined hereinafter. The term "Lower Heating Value" (or net calorific value) of the gaseous reformate is defined as the amount of heat released by combusting a specified composition and quantity of gaseous reformate initially at 25° C. to full combustion products ($CO_2$ and $H_2O$), and returning the temperature of the combustion products to 150° C., which assumes a latent heat of vaporization of water in the reaction products is not recovered. The skilled person will recognize that at "equilibrium" the rate of forward reaction converting hydrocarbon fuel to reformate equals the rate of reverse reaction converting reformate to hydrocarbon fuel. The distribution of reformate products in a CPDX process is equilibrium driven, and the LHV of a gaseous reformate will be less than the LHV of the hydrocarbon fuel fed to the reformer. As an example, the LHV of a gaseous reformate produced from gasoline under specific operating conditions might only be 80 percent of the LHV of the gasoline fuel fed to the reformer. Note that in this invention we compare the LHV of the gaseous reformate actually produced with the LHV of the gaseous reformate calculated at equilibrium for the specific fuel and selected process conditions. In one exemplary embodiment, the reforming efficiency refers to a single-pass reforming efficiency, wherein the term "single pass" refers to passing the first supply of hydrocarbon fuel and the first supply of oxidant only once through the reformer.

In one exemplary embodiment, the reforming catalyst comprises a mesh or porous structured substrate as described in detail hereinafter. In another exemplary embodiment, the reforming catalyst comprises a mesh or porous structured substrate having an ultra-short-channel-length. In yet another exemplary embodiment, the reforming catalyst comprises a metal or ceramic mesh substrate having an ultra-short-channel-length and having at least one Group VIII metal deposited thereon.

Following the reforming step, in one embodiment the gaseous reformate is cooled to provide for a cooled gaseous reformate, desirably, without substantial condensation of any of the gaseous components in the reformate. Cooling is not necessarily required. With or without cooling, the gaseous reformate is mixed with a second supply of oxidant in a quantity such that the gaseous reformate comprises from greater than about 1 to less than about 18 volume percent of the total volume of resulting mixture comprising the gaseous reformate and the second supply of oxidant, this mixture being referenced herein as the "reformate blended oxidant". Lastly, the reformate blended oxidant is fed along with a second supply of high octane hydrocarbon fuel to the spark-ignited internal combustion engine where ignition and combustion occur.

In another exemplary embodiment, this invention provides for a novel process of operating a spark-ignited internal combustion engine under steady state operating conditions with improved fuel efficiency and reduced emissions. The process comprises:
  (a) in an on-board fuel reformer contacting a first supply of hydrocarbon fuel having an average octane number of greater than about 80 and a first supply of oxidant with a reforming catalyst comprising a mesh or porous structured substrate having an ultra-short-channel-length, the contacting being conducted under partial oxidation reaction conditions sufficient to produce a gaseous reformate comprising hydrogen and carbon monoxide with a reforming efficiency greater than about 75 percent relative to equilibrium;
  (b) mixing the gaseous reformate with a second supply of oxidant to form a reformate blended oxidant, wherein the gaseous reformate comprises from greater than about 1 to less than about 18 volume percent of the total volume of the reformate blended oxidant; and
  (c) feeding the reformate blended oxidant and a second supply of high octane hydrocarbon fuel having an average octane number greater than about 80 into the spark-ignited internal combustion engine, igniting the resulting mixture, and maintaining combustion under steady state conditions.

In another exemplary embodiment, this invention provides for a novel process of operating a spark-ignited internal combustion engine under steady state operating conditions with improved fuel efficiency and reduced emissions, comprising:
  (a) in an on-board fuel reformer contacting a first supply of hydrocarbon fuel having an average octane number greater than about 80 and a first supply of oxidant with a reforming catalyst comprising a mesh or porous structured substrate having an ultra-short-channel length and having at least one Group VIII metal supported thereon; the contacting being conducted under partial oxidation reaction conditions sufficient to produce a gaseous reformate comprising hydrogen and carbon monoxide with a reforming efficiency greater than about 75 percent relative to equilibrium;
  (b) cooling the gaseous reformate so as provide for a cooled gaseous reformate;
  (c) mixing the cooled gaseous reformate with a second supply of oxidant to form a reformate blended oxidant, wherein the gaseous reformate comprises from greater than about 1 to less than about 18 volume percent of the total volume of the reformate blended oxidant; and (d) feeding the reformate blended oxidant and a second supply of high octane hydrocarbon fuel having an average octane number greater than about 80 into the spark-ignited internal combustion engine, igniting the resulting mixture, and maintaining combustion under steady state conditions.

The hydrocarbon fuels supplied to the reformer and the SI-ICE (herein referenced, respectively, as "first supply" and "second supply" of hydrocarbon fuel) each individually comprise any liquid or gaseous hydrocarbon fuel derived from petroleum fossil fuels, renewable biomass, or synthetic fuel sources, such as Fisher-Tropsch processes, provided that such hydrocarbon fuels meet the octane number specifications required herein. Generally, the liquid hydrocarbon fuel is found in a liquid state within a temperature range from about −45° C. to about +140° C. at about 1 atm (101 kPa) pressure. Pertaining to liquid hydrocarbon fuels, their boiling point or distillation point is liquid fuel specific, but generally ranges from about 160° C. to about 350° C. at about 1 atm (101 kPa). In one exemplary embodiment, each of the first and second supplies of liquid hydrocarbon fuel consists essentially of a single hydrocarbon component. In another exemplary embodiment, each of the first and second supplies of liquid hydrocarbon fuel comprises a complex mixture of paraffinic, cycloaliphatic, and aromatic hydrocarbons as known in the art. In contrast, the gaseous hydrocarbon fuel generally occurs in a gaseous state within a temperature range from about −45° C. to about +140° C. at about 1 atm (101 kPa) pressure. Likewise, in one embodiment, each of the first and second supplies of gaseous hydrocarbon fuel consists essentially of a single hydrocarbon component; whereas in another embodiment, each of the first and second supplies of gaseous hydrocarbon fuel comprises a mixture of gaseous components.

As known in the art, the term "octane number" or "octane rating" is used as a measure of how much compression a hydrocarbon fuel can withstand before the fuel detonates or self-ignites. Self-ignition, which occurs before the intended spark-ignition, leads to knocking and engine damage. The octane number of the hydrocarbon fuel is defined by comparison with anti-knocking properties of known mixtures of isooctane (2,2,4-trimethylpentane) and heptane. Isooctane and heptane are assigned octane numbers of 100 and 0, respectively, where 100 represents a high limit of compression capability without self-ignition and 0 represents a low limit of compression capability before self-ignition. The known mixture that most closely matches the anti-knocking property of the fuel being tested determines the octane rating of that fuel. As an example, if gasoline is tested, and the closest known mixture is 90 percent isooctane and 10 percent heptane, then the test gasoline would receive an octane number of 90.

The art recognizes different methods of testing octane number. Research Octane Number (RON) tests a fuel in a test engine at 600 RPM and compares the results with mixtures of isooctane and heptane. Motor Octane Number (MON) tests a fuel in a 900 RPM engine under different test conditions. The MON of gasoline is about 8 to 12 octane points lower than its RON. In the United States fuels at a gas pump are rated with an average of the RON and the MON. Accordingly, for the purposes of this invention, the term "octane number" as used herein follows the U.S. rating system and is therefore the average octane number (AVE ON) calculated as (RON+MON)/2. In this invention the first and second supplies of hydrocarbon fuel each independently have an AVE ON greater than about 80; in one embodiment, greater than about 85; in another embodiment, greater than about 87; and in yet another embodiment, greater than about 90.

In one exemplary embodiment, the first and second supplies of liquid hydrocarbon fuel are selected from gasoline having an octane number greater than about 80. In yet another exemplary embodiment, the first and second supplies of gaseous hydrocarbon fuel having an octane number greater than 80 are selected from methane, natural gas, ethane and mixtures thereof. In another exemplary embodiment, the hydrocarbon fuel supplied to the reformer (first supply of HC fuel) is identical to the hydrocarbon fuel supplied to the SI-ICE (second supply of HC fuel). In another exemplary, the hydrocarbon fuel supplied to the reformer (first supply of HC fuel) is different from the hydrocarbon fuel supplied to the SI-ICE (second supply of HC fuel).

The oxidant supplied to the reformer (first supply of oxidant) comprises any chemical capable of partially oxidizing the high octane hydrocarbon fuel selectively to a gaseous reformate comprising hydrogen and carbon monoxide (syngas). Suitable oxidants include, without limitation, essentially pure molecular oxygen, mixtures of oxygen and nitrogen, such as air, and mixtures of oxygen and one or more inert gases, such as helium and argon. The oxidant supplied to the SI-ICE (second supply of oxidant) comprises any chemical, typically oxygen supplied as essentially pure oxygen or as air, capable of fully combusting the reformate and second supply of hydrocarbon fuel to complete combustion products including carbon dioxide and water. In one exemplary embodiment, the first and second supplies of oxidant are identical. In another exemplary embodiment, the first and second supplies of oxidant each comprise air. If desired, however, the first and second supplies of oxidant may be different.

The first supplies of fuel and oxidant are provided to the reformer in a "fuel-rich" ratio such that there is insufficient amount of oxidant present to convert all of the fuel to complete oxidation products, namely, carbon dioxide and water. The quantities employed of first supplies of fuel and oxidant are best described in terms of an O:C ratio, wherein "O" refers to atoms of oxygen in the first supply of oxidant and "C" refers to atoms of carbon in the first supply of hydrocarbon fuel. Generally, the O:C ratio of oxidant to hydrocarbon fuel fed to the reformer is greater than about 0.5:1 and less than about 1.2:1.

In one embodiment, the reforming process desirably involves contacting the first supply of hydrocarbon fuel and first supply of oxidant in the absence of co-fed external water, steam or mixture thereof. In this instance, the term "co-fed external water, steam or mixture thereof" refers to co-feeding with the first supplies of fuel and oxidant a supply of water, steam, or such mixture thereof as is imported from an external source, for example, an on-board water tank or steam generator or vaporizer. While this application broadly does not prohibit co-feeding water and/or steam to the reforming process, and while reformate yields are often enhanced by the addition of co-fed water and/or steam, in the present application co-feeding external water and/or steam might present certain disadvantages. For one, carrying a supply tank of water and a water vaporizer or steam generator onboard is generally burdensome for motive applications. Also, an increased volume and heat content of steam in the reformate might induce a less than optimal operation of the downstream internal combustion engine. On the other hand, recycling to the reformer a portion of the IC engine exhaust gas (EGR) containing a comparatively smaller quantity of steam is permissible and may be beneficial. Thus, in another embodiment, exhaust gas from the IC engine is recycled to the reformer.

The reformer beneficially employed in the process of this invention is any of those reformers known in the art that provides for conversion of a hydrocarbon fuel into a gaseous reformate comprising hydrogen and carbon monoxide with a reforming efficiency greater than about 75 percent relative to equilibrium, as noted hereinbefore. Non-limiting examples of suitable reformers include those described in the following patent documents: U.S. Pat. Nos. 7,976,594; 8,557,189; WO 2004/060546; and US 2011/0061299, incorporated herein by reference. While the invention is described herein in terms of employing only one reformer module per one combustion engine, another embodiment of the invention provides for a plurality of reformer modules, for example two or more, to be integrated with one combustion engine. In most applications, one reformer module will satisfy the reformate requirements of the engine.

According to the invention, the first supply of high octane hydrocarbon fuel is fed from a fuel supply, such as a fuel tank, through a fuel inlet into the reformer, preferably first into a mixer within the reformer. The fuel inlet comprises any known device for feeding the gaseous or liquid hydrocarbon fuel to the reformer, for example, a nozzle, atomizer, vaporizer, injector, mass flow meter, or any other suitable flow control device. The injector also functions to quantify (or meter) the fuel fed to the reformer. Likewise, the first supply of oxidant is fed into the mixer through an oxidant inlet comprising any conventional inlet device, for example, a nozzle, injector, or mass flow meter.

In one embodiment, the mixer of the reformer comprises swirler vanes and baffles to facilitate mixing the first supplies of hydrocarbon fuel and oxidant as well as to facilitate atomization of any liquid fuel. In one other embodiment, the mixer comprises a combination of a pulsed electromagnetic liquid fuel injector and a pulsed oxidant injector, which feed the first supplies of liquid fuel and oxidant, respectively, into an atomizer that thoroughly atomizes the liquid fuel and mixes it with the oxidant. This combined dual injector-atomizer device is described in U.S. Pat. No. 8,439,990, incorporated herein by reference.

In one embodiment, the first supply of hydrocarbon fuel is fed to the mixer at ambient temperature without preheating. In another embodiment, the first supply of hydrocarbon fuel is preheated prior to being fed to the mixer. We have found that heat generated in the catalytic reaction zone of the reformer is sufficient to support liquid fuel vaporization at a level required for stable partial oxidation throughout the reforming catalyst. As a consequence, the reformer and reforming process of this invention provide gasification of the liquid fuel without a requirement for supplying external heat or steam to the reformer. The first supply of oxidant is generally fed into the mixer at the same temperature as the hydrocarbon fuel, but may be fed at a temperature hotter or colder as desired. In one embodiment, the first supply of oxidant is fed to the mixer at ambient temperature. In another embodiment, the first supply of oxidant is fed as a heat exchange fluid into a heat exchanger, where the oxidant is preheated prior to being fed into the reformer.

The fuel reformer comprises a catalytic reaction zone having disposed therein a substrate onto which a reforming catalyst is supported, such substrate configured to provide thorough mixing of the fuel and oxidant passing there through. To achieve this goal, in one embodiment the substrate is provided as a mesh substrate, structured as a reticulated net or reticulated screen comprising a plurality of pores or cells or channels, preferably, having an ultra-short-channel-length as noted hereinafter. In one embodiment the mesh is suitably provided in a coiled configuration of cylindrical shape having an inner diameter and a larger outer diameter such that reactants flowing there through move along a radial flow path from an inlet along the inner diameter to an outlet along the outer diameter. In another embodiment the mesh is suitably provided as one sheet or a plurality of stacked sheets with an inlet at one end of the stack and an outlet at an opposite end of the stack. Either way, the bulk configuration of the substrate provides for a plurality of void volumes in random order, that is, empty spaces having essentially no regularity along the flow path from inlet to outlet.

The mesh is typically constructed from any material capable of withstanding the temperature at which the reformer operates. Such materials include metals and ceramic materials. Suitable metal meshes include, without limitation, those constructed from nickel-chrome-iron alloys, iron-chromium alloys, iron-chromium-aluminum alloys, and iron-chromium-nickel alloys of acceptable temperature durability. The term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing insulating layers of ultra-short-channel-length ceramic mesh comprising woven silica, both patents incorporated herein by reference.

In one exemplary embodiment, the substrate comprises an ultra-short-channel-length mesh; in a more preferred embodiment thereof a MICROLITH® brand ultra-short-channel-length mesh available from Precision Combustion, Inc., North Haven, Conn., USA. A description of the ultra-short-channel-length mesh is found, for example, in U.S. Pat. No. 5,051,241, incorporated herein by reference. Generally, the mesh comprises short channel length, low thermal mass monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). In this invention the term "channel length" is taken as the distance along a pore or channel from inlet to outlet, for example, as measured from an inlet on one side of a sheet of mesh to an outlet on another side of the sheet. (This measurement is not to be confused with the overall length of the flow path through the entire mesh substrate from an inlet at the inner diameter of the coiled mesh, for example, to an outlet at the outer diameter of the coiled mesh.) In another embodiment, the channel length is not longer than the diameter of the elements from which the mesh is constructed; thus, the channel length may range from 25 μm (0.001 inch) up to about 100 μm (0.004 inch) and preferably not more than about 350 μm (0.014 inch). In view of this ultra-short channel length, the contact time of reactants with the mesh and catalyst supported thereon advantageously ranges from about 5 milliseconds (5 msec) to about 350 msec.

The MICROLITH® brand ultra-short-channel-length mesh typically comprises from about 100 to about 1,000 or more flow channels per square centimeter. More specifically, each layer of mesh typically is configured with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. MICROLITH® brand meshes can be manufactured in the form of woven wire screens, woven ceramic fiber screens, pressed metal or ceramic screens, or they can be manufactured by perforation and expansion of a thin metal sheet as disclosed in U.S. Pat. No. 6,156,444, incorporated herein by reference; or alternatively manufactured by 3-D printing or by a lost polymer skeleton method.

The MICROLITH® brand mesh having the ultra-short-channel-length facilitates packing more active surface area into a smaller volume and provides increased reactive area and lower pressure drop, as compared with prior art monolithic substrates. Whereas in prior art honeycomb monoliths having conventional long channels where a fully developed boundary layer is present over a considerable length of the channels; in contrast, the ultra-short-channel-length characteristic of the mesh of this invention avoids boundary layer buildup. Since heat and mass transfer coefficients depend on boundary layer thickness, avoiding boundary layer buildup enhances transport properties. Employing the ultra-short-channel-length mesh, such as the MICROLITH® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference. The preferred MICROLITH® brand of ultra-short-channel-length mesh also advantageously provides for a light-weight portable size, a high throughput, a high one-pass yield of hydrogen-containing reformate, a low yield of coke and coke precursors, and an acceptably long catalyst lifetime, as compared with alternative substrates including ceramic monolith and pelleted substrates.

In another exemplary embodiment, the mesh is constructed of an analogous porous structure of metal, ceramic, or other porous structured substrate material having an ultra-short-channel length, comprising an interconnected network of solid struts defining a plurality of pores of an open-cell configuration. The pores can have any shape or diameter; but typically, a number of pores that subtend one inch designates a "pore size," which for most purposes ranges from about 5 to about 80 pores per inch. The relative density of such structures, taken as the density of the structure divided by the density of solid parent material of the struts, typically ranges from about 2 to about 15 percent. Manufactured or structured ultra-short-channel-length substrates are commercially available in a variety of materials capable of withstanding the operating temperature of the reformer.

The mesh substrate disposed within the reforming zone of the reformer supports a reforming catalyst capable of facilitating partial oxidation reactions, wherein a hydrocarbon fuel is converted to partially-oxidized products, namely, a reformate of synthesis gas comprising hydrogen and carbon monoxide. A suitable reforming catalyst comprises at least one metal of Group VIII of the Periodic Table of the Elements, including iron, cobalt, nickel, ruthenium, rhodium, palladium, osmium, iridium, platinum, and mixtures thereof. The deposition of the Group VIII metal(s) onto the mesh is implemented by methods well known in the art. Alternatively, finished catalysts comprising Group VIII metal(s) supported on the MICROLITH® brand mesh substrate are available from Precision Combustion, Inc., North Haven, Conn.

In the reforming process the mesh substrate supporting the reforming catalyst is initially heated using a commercial ignition device, for example a resistive glow plug heating element, disposed within the reformer near the mesh. The first supplies of fuel and oxidant fed to the reformer are likewise heated via the ignition device. The ignition device is energized until temperature sensors located within the reformer indicate a temperature sufficient to initiate catalytic activity ("light-off temperature"). Once the catalyst is ignited, the ignition device is de-energized, and energy from the resulting exothermic partial oxidation reaction sustains catalytic operation without a need for inputting external heat. The ignition device allows for start-up from cold or ambient fuel conditions without a need for a fuel vaporizer or other external source of heat.

The reforming process operates at a temperature greater than about 700° C. and less than about 1,100° C. and a pressure ranging from sub-ambient to about 1 prig (6.9 kPa). A suitable gas hourly space velocity measured at 21° C. and 1 atm (101 kPa) ranges from about 10,000 liters of combined first supply of hydrocarbon fuel and first supply of oxidant per liter of catalyst bed volume per hour (10,000 $hr^{-1}$) to about 750,000 $hr^{-1}$ which allows for high throughput. A reforming efficiency of greater than about 75 percent and, preferably, greater than about 80 percent relative to equilibrium is achievable. The reformer is capable of operating for greater than about 1,000 hours without indications of coke production and catalyst deactivation, In the process of this invention, the gaseous reformate can be stored in one or more pressurized storage vessels until called for by the IC engine; however, there is no requirement to store the reformate. Instead, the gaseous reformate can be produced in the fuel reformer in-situ as needed and fed on demand directly into the engine.

In one embodiment, the gaseous reformate exiting the reformer is cooled for the purpose of increasing volumetric density of the reformate, resulting in an increased energy density. Cooling additionally retards wasteful pre-combustion of hydrogen when feeding the hot reformate into the second supply of oxidant. Any method of cooling the gaseous reformate is suitably employed including passing the gaseous reformate through a conventional heat exchanger. Alternatively, the gaseous reformate can be cooled in a turbocharger of the IC engine. If cooling is employed, the cooled reformate has a temperature desirably between about 40° C. and about 150° C. Cooling, however, is not a requirement; therefore in another embodiment, no cooling is employed and the gaseous reformate exiting the reformer is fed directly into the second supply of oxidant and thence into the internal combustion engine.

With or without cooling, the reformate comprising hydrogen and carbon monoxide is mixed with a suitable quantity of the second supply of oxidant, as an example, engine intake air. The resulting gaseous mixture comprising the reformate and second supply of oxidant, referred to as the reformate blended oxidant, is fed into each cylinder of the SI internal combustion engine. Since the efficiency of the reformer is high, only a small volumetric quantity of reformate is needed to ensure engine performance improvements. Accordingly, the gaseous reformate fed to the engine is typically greater than about 1 volume percent, and in one exemplary embodiment greater than about 3.5 volume percent, based on the total volume of reformate blended oxidant fed to the engine. Typically, the gaseous reformate fed to the engine is less than about 18 volume percent, in one exemplary embodiment less than about 16.5 volume percent, and in another embodiment less than about 10 volume percent, based on the total volume of reformate blended oxidant fed to the engine. Generally, the hydrogen fed to the engine comprises from about 18 to about 25 volume percent of the total volume of reformate present in the reformate blended oxidant. These volumes allow for near-normal volumes of oxidant (air or oxygen) to be supplied to the IC engine resulting in a conservation of energy output. As an advantageous consequence, the process of this invention can be utilized through steady state operation of the engine.

The internal combustion engine comprises any conventional spark-ignited IC engine designed to operate on a liquid or gaseous hydrocarbon fuel having an octane number greater than about 80. Suitable examples of such engines include conventional SI motive engines, including gasoline and natural gas engines, adapted for small engine applications, such as a lawn mower, or adapted for a transport vehicle, such as an automobile, bus, boat, or motorcycle. In any of these embodiments the internal combustion engine comprises one or more combustion cylinders, each one fitted with a reciprocating piston as well as coupled to an intake manifold for introducing into each combustion cylinder the supply of high octane fuel (second supply of hydrocarbon fuel or engine fuel) and the reformate blended oxidant containing the reformate and second supply of oxidant. Such engines include conventional two-stroke and four-stroke engines as known in the art. A spark igniter is disposed in each combustion cylinder as known in the art. For exhausting gaseous combustion products, each cylinder comprises an outlet valve. Typically, the SI engine comprises from one (1) to twelve (12) reciprocating pistons.

Figure 1:
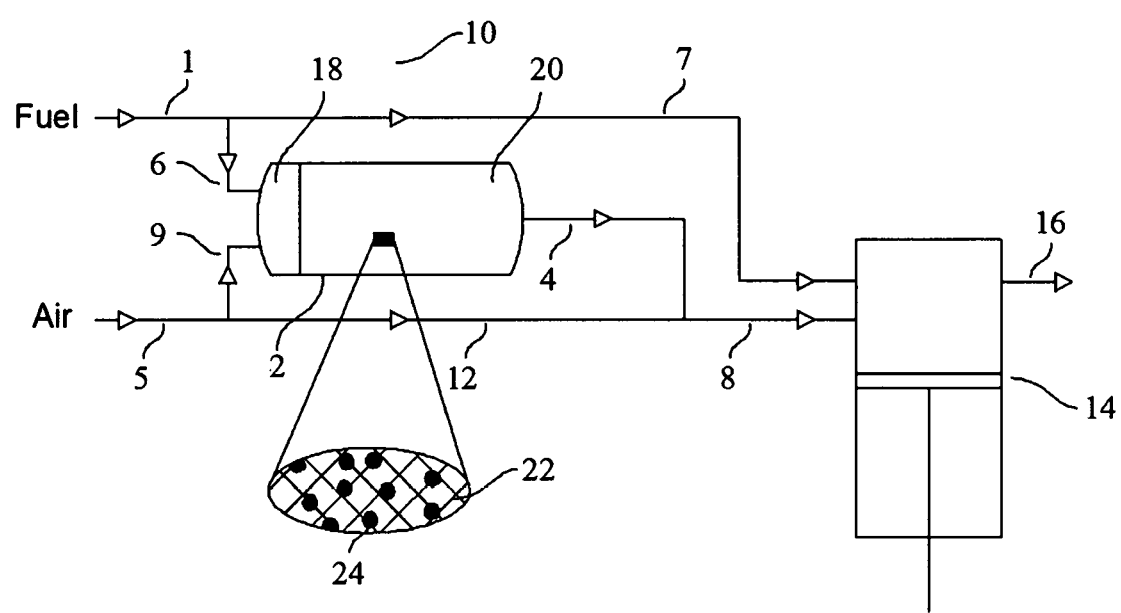
FIG. 1 depicts a schematic of the process of this invention of operating a spark-ignited internal combustion engine (SI-ICE) on a hydrocarbon fuel augmented with a gaseous reformate produced in an on-board fuel reformer.

FIG. 1 depicts a schematic diagram of the system (10) and process utilized in this invention, the system comprising a SI-ICE (14) having a fuel reformer (2) integrated therewith. The high octane hydrocarbon fuel, fed from a fuel supply line (1), is split into a fuel feed (6) (first supply of fuel) to the reformer (2) and fuel feed (7) (second supply of fuel) to the SI-ICE (14). The quantity of high octane hydrocarbon fuel split off to the reformer depends upon the efficiency of the reformer and the percentage of hydrogen desired to be delivered to the engine intake. Further to FIG. 1, the oxidant, typically air, fed from oxidant feed line (5) is split into a first supply of oxidant (9) to the fuel reformer (2) and a second supply of oxidant (12) destined for the SI-ICE (14). The air to fuel ratio (AFR), expressed as a weight ratio (g/g) of total oxidant to total hydrocarbon fuel fed to integrated system (10), generally ranges from about 14.7:1 to about 30.0:1, where the term "total oxidant" refers to a sum of the first and second supplies of oxidant, and the term "total fuel" refers to a sum of the first and second supplies of the high octane hydrocarbon fuel. For a high octane gasoline fuel, at 14.7:1 the AFR is considered to be stoichiometric; at a ratio greater than about 15.0:1, the AFR is considered to be fuel-lean. This invention allows for stable operation under substantially lean conditions where combustion typically becomes unstable.

Further to FIG. 1, the first supplies of fuel (6) and oxidant (9) are fed to the reformer (2), into a mixing zone (18) and thence into a catalytic reforming zone (20) for contact with a reforming catalyst illustrated as a mesh (22) having a reforming catalyst (24) deposited thereon. Under reaction process conditions, the first supplies of fuel and oxidant are converted into a gaseous reformate comprising hydrogen and carbon monoxide, which exits the reformer (2) in outlet line (4). Thereafter, the reformate of outlet line (4) is mixed in supply line (8) with the second supply of oxidant derived from stream (12). The resulting gaseous mixture of reformate and second supply of oxidant (the reformate blended oxidant) is fed from feed line (8) to the engine (14). In supply line (8), the reformate comprises from greater than about 1 to less than about 18 volume percent, calculated on the total volume of reformate blended oxidant fed to the engine (14). In reformer exit line (4), hydrogen comprises from about 18 to about 25 volume percent, calculated on total volume of reformate. The second supply of the high octane hydrocarbon fuel (7) is fed to the engine (14) where ignition and combustion occur resulting in combustion products exiting the engine (14) through exhaust (16).

When the spark-ignited internal combustion engine is operated with reformate augmentation in accordance with this invention as described hereinabove, a variety of engine performance indicators show improvement even under steady state operating conditions, as compared to operating without reformate augmentation. As one parameter, knock intensity is significantly reduced over a wide range of spark timings. Fuel consumption is decreased by at least about 3 percent essentially without a loss in power output, thereby resulting in increased fuel efficiency. Hydrocarbon and carbon monoxide emissions from the SI-IC engine are reduced by greater than about 8 and 3 percent, respectively. Surprisingly, nitrogen oxide emissions from the engine are reduced by more than about 10, preferably, more than about 13 percent. With reformate augmentation, ignition and burn rates are quicker even at lean air to fuel ratios (AFR) of greater than 18:1. Finally, the engine exhibits a more stable combustion, as measured by a reduction in a coefficient of variation (CoV) of indicated mean effective pressure (IMEP) even at lean AFR ratios of greater than 18:1.

EMBODIMENTS

Example

A commercial spark-ignited internal combustion engine (SI-ICE) (0.75 liter, three-cylinder Mercury outboard engine) designed for operation on gasoline was modified in accordance with this invention to operate on a mixture of gasoline augmented with a gaseous reformate. The engine was naturally aspirated and specifications are given in Table 1.

TABLE 1

| Engine Integration | |
|---|---|
| Bore [cm] | 6.5 |
| Stroke [cm] | 7.5 |
| Connecting Rod [cm] | 11.3 |
| Displacement [cm] | 747 |
| Compression Ratio [—] | 9.7 |
| Rated Speed [RPM] | 5500 |
| Rated Power [kW] | 29.8 |

With reference to FIG. 1, room air stored in an engine air plenum (2 gallon) taken through supply stream (5) was split into a first oxidant feed (9) to reformer (2) and a second oxidant feed stream (12) (engine air), the latter fed to reformate blended oxidant stream (8) destined for the SI-IC engine (14). A fuel reformer (2) was installed upstream of the engine air intake stream (8) so as to introduce a gaseous reformate stream (4) comprising $H_2$ and CO into the second supply of oxidant (12) to form the reformate blended oxidant stream (8).

Further referencing FIG. 1, the reformer (2) was constructed for introduction of a liquid fuel inlet stream (6) including a fuel meter; an air inlet stream (9) including an air meter; a mixing zone (18) within the reformer body (2) for atomizing and mixing the liquid fuel and air, and a catalytic reaction zone (20) comprising an ultra-short-channel-length (USCL) metal mesh substrate (22) having a rhodium-based catalyst (24) supported thereon (MICROLITH® brand USCL catalytic substrate, Precision Combustion, Inc., North Haven, Conn.). The substrate was configured into a cylindrical coil having an inlet path for entry of the fuel-air mixture at an inner diameter and an exit path for gaseous reformate at an outer diameter, and having a flow path from the inner diameter to the outer diameter through random disposition of void volumes in the metal mesh. A glow plug functioning as an ignition source was positioned within a portion of the space defined by the inner diameter of the cylindrical coil.

The reformer was operated on a mixture of air and EEE lube-certified gasoline (Haltermann Solutions, Research Octane Number 96.0, Motor Octane Number 88.4; Average ON 92.2), both air and fuel filtered before entry into the reformer. At steady state, the reformer operating conditions included an O:C ratio of 0.9 and an average catalyst temperature of between 800° C. and 850° C. The flow rate of air was varied to maintain the designated temperature. A gaseous reformate was produced of the following composition (Mole percent dry basis, except as noted): hydrogen ($H_2$), 21.7; carbon monoxide (CO), 24.2; carbon dioxide ($CO_2$), 1.4; methane ($CH_4$), 1.7; higher hydrocarbons ($C_{2+}$), 5,000 ppm; nitrogen ($N_2$), 50.5. The reformer and reforming process resulted in a reforming efficiency greater than 75 percent relative to equilibrium, calculated on LHV for the selected fuel, reformate species, and process conditions.

The reformate exiting the reformer (2) in exit stream (4) was mixed with sufficient air from feed stream (12) to provide for a reformate blended oxidant mixture containing from 1 to 18 volume percent reformate. The reformate blended oxidant was fed in supply stream (8) to the cylinders of the engine (14).

Liquid fuel was delivered via supply stream (7) to the engine (14) via the standard port-injection system of the engine. Full control of fueling was enabled through an Engine Control Unit (ECU) provided by Mercury Marine. Liquid fuel flow rate was determined by a calibrated Coriolis flow meter. Engine testing with addition of gaseous reformate was performed using the Tier II EEE gasoline fuel noted hereinabove. The air-fuel ratio (AFR) delivered to the engine was measured using an oxygen sensor in the exhaust port. The air flow rate was back-calculated using the ECU fuel flow rate and the measured AFR. Pressure data were acquired using a time-based system that streamed directly to disk and allowed continuous sampling throughout the test period. A sampling frequency of 200 kHz was used, which provided full fidelity for knocking pressure acquisition, and for this study data sets of 1500 cycles were acquired. The large number of cycles ensured fully converged statistics.

The effects of reformate augmentation on engine performance were tested using two protocols described below. For comparative purposes, engine performance was tested in the same manner using the Tier II EEE gasoline without augmentation with reformate.

A Six-Mode Test to Study the Effect of Reformate Addition on Combustion Stability:

Six sets of test conditions, as set forth in Table 2, were selected under which to evaluate the system. The spark timing was manually optimized. At the start, for comparative purposes operation was established with gasoline (EEE, Haltermann Solutions) without reformate augmentation. Testing was performed at constant load by adjusting the throttle and fueling rate accordingly. Next, in accordance with the process of this invention, the reformer was activated and a reformate comprising hydrogen and carbon monoxide was added to the engine air intake stream (second supply of oxidant), and the standard fuel flow rate was reduced to establish same operating conditions at the standard-fuel best spark timing. The current test engine did not have provisions for exhaust gas recirculation (EGR); hence, the lean limit was examined by using additional air. The AFR ranged from 15:1 to 20:1 to study the effect of reformate addition on engine combustion stability at lean conditions.

TABLE 2

Engine operating conditions for six-mode test

| Mode | Speed [RPM] | IMEP [bar] | Indicated Power [kW] | Brake Torque [Nm] | APR |
|---|---|---|---|---|---|
| 1 | 2000 | 3.5 | 4.36 | ~12 | 15, 18 |
| 2 | 2000 | 5 | 6.22 | ~19.5 | 15, 18, 20 |
| 3 | 2300 | 6.3 | 9.02 | ~27 | 15, 18, 20 |
| 4 | 2400 | 7.9 | 11.80 | ~35 | 15, 18, 20 |
| 5 | 3000 | 8.9 | 16.61 | ~40 | 15, 18, 20 |
| 6 | 3250 | 6.2 | 12.54 | ~26 | 15, 18, 20 |

Under all six-mode test conditions wherein the reformer was operational and reformate augmentation was employed, combustion stability was at least as good, and in many instances improved as compared to operation without reformate augmentation. The improvement was evidenced by a reduction in a Coefficient of Variation (CoV) of Indicated Mean Effective Pressure (IMEP), as discussed hereinafter.

Knock-Limited Spark Advance Timing (KLSA) Test:

Spark-ignition engine efficiency is limited by the occurrence of knock, which provides an effective limit on compression ratio and spark timing and thus fuel efficiency. Spark timing should be retarded from its best-efficiency value to avoid knock at low speed and high load conditions. The KLSA was measured on the second cylinder by performing an ignition timing sweep at 2000 RPM and a nominal condition of 95 percent load at 12.15 kW power. AFR was held constant at 15:1. Spark timing sweep (holding load constant) was performed with reformate addition in accordance with this invention and again without reformate addition for comparative purposes. The intensity of knock was determined using maximum amplitude of pressure oscillation (MAPO) that was found by high-pass filtering pressure data. A 5 kHz cutoff frequency with a Butterworth filter was used to isolate the knock pressure oscillations from the low-frequency pressure signal.

Figure 2:
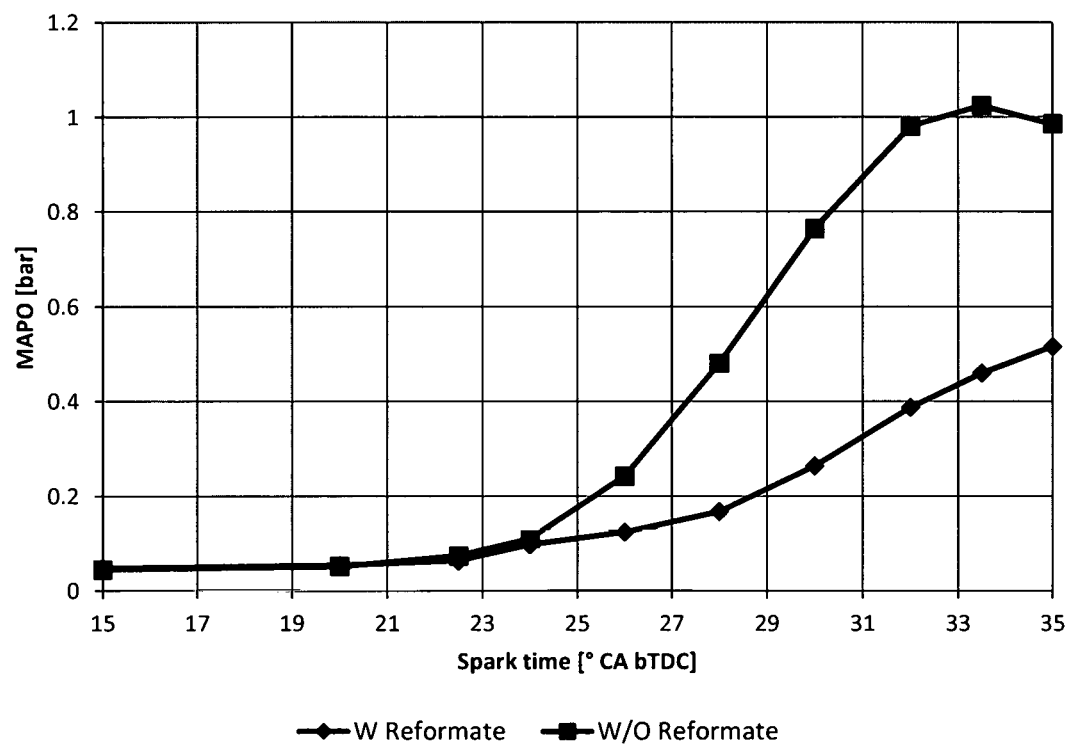
FIG. 2 depicts a graph plotting Maximum Amplitude of Pressure Oscillation (MAPO) as a function of Spark Time, expressed as Crank Angle before Top Dead Center (° CA bTDC), for an embodiment of the process of this invention.

Knock Intensity:

When the engine fuel was supplemented with reformate, the knock intensity set forth as Maximum Amplitude Pressure Oscillation (MAPO) was lower in essentially all instances over a spark time ranging from 20 to 35 degrees Crank Angle before Top Dead Center (° CA bTDC), as seen in FIG. 2. The potential benefit of reduced knock intensity is that it allows advancing the spark timing to occur at the minimum advance for best torque (MBT) value. The high octane number of EEE gasoline fuel means that the knock intensity levels in FIG. 2 are modest; often a threshold level of 1 bar is used to identify the presence of knock. While use of a lower octane fuel, less than the ON 92.2 as used in this example, should result in higher knock intensity, amplification of the aforementioned MAPO benefit due to reformate addition is expected.

Figure 3:
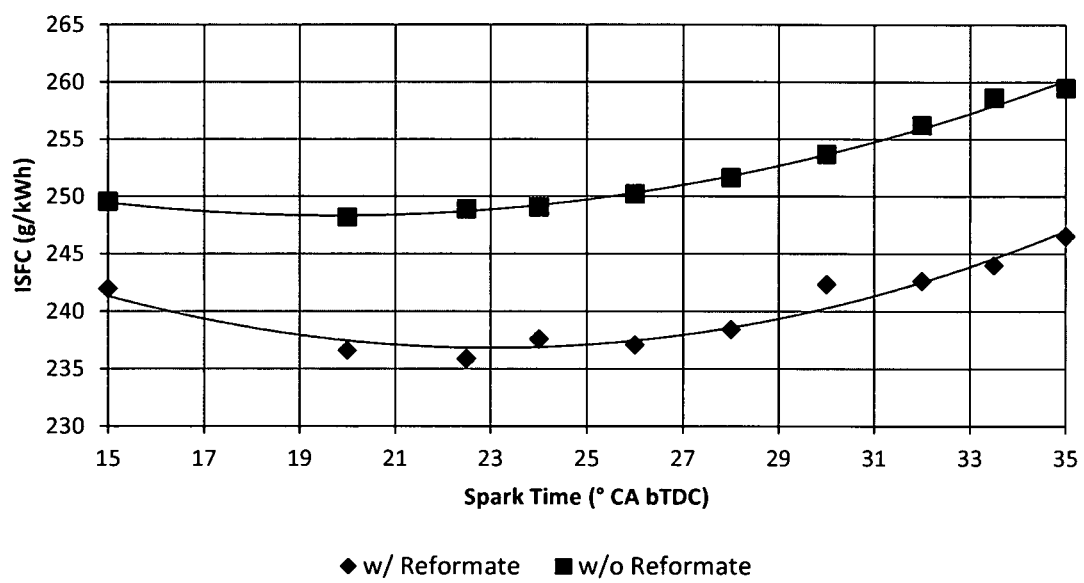
FIG. 3 depicts a graph of Indicated Specific Fuel Consumption (ISFC) as a function of Spark Time, expressed as Crank Angle before Top Dead Center (° CA bTDC), for an embodiment of the process of this invention.

Indicated Specific Fuel Consumption (ISFC):

As seen in FIG. 3, the ISFC defined as fuel flow rate per unit power output (g/kW-hr) was found to be lower for all spark timings over a range from 15 to 35° CA bTDC when the engine fuel was supplemented with reformate. The ISFC is a measure of fuel efficiency, with lower values of ISFC indicating higher fuel efficiency. Without reformate addition, the maximum fuel efficiency occurred at a spark timing of about 20° CA bTDC for all three cylinders of the engine. With addition of reformate to the engine intake, the maximum fuel efficiency occurred at a spark timing of 22° CA bTDC for all three cylinders. The ISFC was lower by 5 percent at a spark timing of 20-22° CA bTDC with reformate addition.

Figure 4:
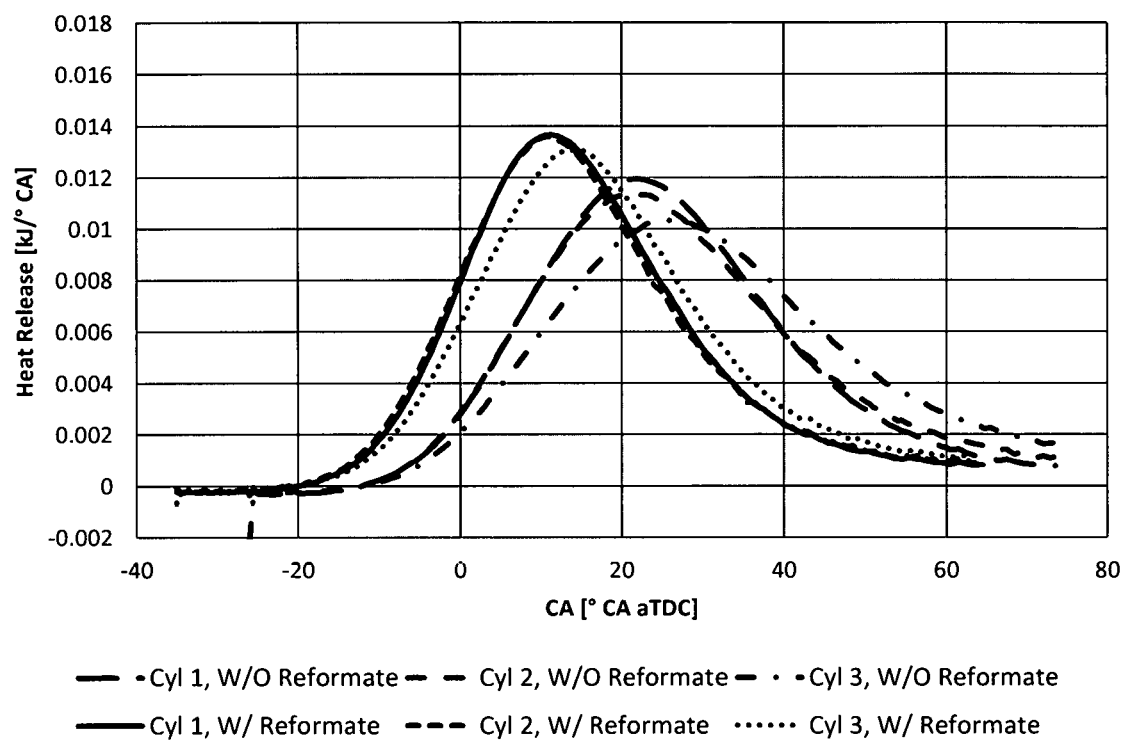
FIG. 4 depicts a graph of Heat Release as a function of Spark Time, expressed as Crank Angle after Top Dead Center (° CA aTDC), for an embodiment of the process of this invention.

Combustion Characteristics:

FIG. 4 depicts curves plotting Heat Release (kJ/° CA) during engine testing at an optimized spark timing and an AFR of 20:1 (i.e. fuel lean) versus Crank Angle after Top Dead Center (° CA aTDC). For each of the three engine cylinders one curve represents reformate augmentation in accordance with this invention and one curve represents without reformate augmentation for comparative purposes. The curves, derived from pressure measurements taken with a high speed pressure sensor located in each cylinder, showed a faster heat release rate with reformate augmentation. For the same spark timing, the heat release (i.e., pressure peak) curve for each cylinder occurred earlier as shown by the fact that a peak in the curve representing added reformate occurred at lower crank angles than a peak in the curve representing no added reformate.

Based on KLSA testing, the initial stage of combustion, dominated by fuel mixture chemistry, was examined by observing changes in CA10, the crank angle at which 10 percent of the fuel charge was burned to completion. The effect on the overall length of the combustion event was measured by CA90, which is the number of crank angle degrees at 90 percent combustion completion. In general, CAx is defined as the crankshaft angle where X percent of the fuel was burned to completion and was constructed by post-processing the in-cylinder pressure measurements.

FIG. 5 shows a decreased ignition delay (CA0-CA10) with the addition of reformate across all spark timings (° CA bTDC) and shows shorter burn times (CA10-CA90) with addition of reformate across all spark timings (° CA bTDC). For example, at a spark timing of 20° CA bTDC, the first 10 percent of the fuel burned in 19 crank angle degrees in the presence of reformate, as compared to 20.5 crank angle degrees in the absence of reformate, as measured from the crank angle at the time of spark. Similarly, at the same spark timing (20° CA bTDC), the next 80 percent of the fuel burned in 32.3 crank angle degrees in presence of reformate, as compared to 37.3 degrees in the absence of reformate. The faster fuel burn rate in the presence of reformate suggests operation closer to the ideal 4-stroke cycle, which explains the better fuel efficiency (ISFC) with reformate addition observed in the KLSA testing. Furthermore, both effects of shorter ignition delay and faster burn time allowed the engine to operate with less spark advance, with improved power at a given fuel input.

Emissions:

Indicated Specific Nitrogen Oxides (ISNO), Indicated Specific Hydrocarbons (ISHC) and Indicated Specific Carbon Monoxide (ISCO) emissions reported as g/(kW-hr) were observed to be lower across the full range of spark times tested, by 16.5 percent, 11 percent, and 5 percent, respectively, when reformate was added to the gasoline fuel. Reference is made to FIGS. 6, 7 and 8 for these results. The lower NOx emissions illustrated in FIG. 6 are particularly surprising, inasmuch as NOx emissions are known to increase with hydrogen augmentation.

Combustion Stability:

Engine combustion stability is represented by the Coefficient of Variation (CoV) of Indicated Mean Effective Pressure (IMEP). CoV of IMEP of less than 2.5 percent represents stable combustion and low cyclic variability. With reference to FIG. 9, the CoV of IMEP was found to be similar with and without reformate addition while operating the engine at stoichiometric conditions (i.e. AFR 15:1) under the Mode 3 test conditions of Table 2. Surprisingly, however, in spite of using high octane fuel, testing at lean conditions at an AFR of 18:1 and 20:1 showed significant improvement in combustion stability when reformate was used to augment the fuel.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A process of operating an internal combustion engine comprising:
    (a) contacting a first supply of high octane hydrocarbon fuel and a first supply of oxidant with a reforming catalyst in a catalytic reaction zone of a fuel reformer, the contacting being conducted under partial oxidation reaction conditions sufficient to produce a gaseous reformate comprising hydrogen and carbon monoxide with a reforming efficiency greater than 75 percent relative to equilibrium;
    (b) mixing the gaseous reformate with a second supply of oxidant to form a reformate blended oxidant wherein the reformate comprises from 1 to 18 volume percent of a total volume of reformate blended oxidant; and
    (c) feeding the reformate blended oxidant from step (b) and a second supply of high octane hydrocarbon fuel into a spark-ignited internal combustion engine, and igniting the resulting mixture thereof under combustion conditions.

2. The process of claim 1 wherein the first and second supplies of hydrocarbon fuel are each independently selected from liquid and gaseous hydrocarbon fuels having an average octane number greater than 80.

3. The process of claim 2 wherein the first and second supplies of hydrocarbon fuel are selected from gasoline.

4. The process of claim 2 wherein the first and second supplies of hydrocarbon fuel are each independently selected from natural gas or methane.

5. The process of claim 1 wherein the first and second supplies of oxidant are each independently selected from molecular oxygen, a mixture of oxygen and nitrogen, and a mixture of oxygen and an inert gas.

6. The process of claim 1 wherein the reforming catalyst comprises a metal or ceramic mesh substrate having an ultra-short-channel-length.

7. The process of claim 6 wherein the ultra-short-channel-length ranges from 25 microns to 500 microns.

8. The process of claim 6 wherein the mesh further comprises from 100 to 1,000 flow channels per square centimeter.

9. The process of claim 6 wherein the mesh further comprises a plurality of channels or pores having a diameter ranging from about 0.25 mm to about 1.0 mm, with a void space greater than 60 percent.

10. The process of claim 1 wherein the reforming catalyst comprises a porous structured substrate having an interconnected network of solid struts defining a plurality of pores of an open-cell configuration of 5 to 80 pores per inch and a relative density of from 2 to 15 percent, as compared with a density of material from which the solid struts are made.

11. The process of claim 1 wherein the reforming catalyst further comprises at least one Group VIII metal deposited on the substrate.

12. The process of claim 1 wherein the reformer is operated at a temperature from 700° C. to 1,100° C. and at an O:C ratio of oxygen atoms in the first supply of oxidant to carbon atoms in the first supply of hydrocarbon fuel ranging from 0.5:1 to 1.2:1.

13. The process of claim 1 wherein the overall air to fuel ratio, expressed as a weight ratio (g/g) of total first and second supplies of oxidant to total first and second supplies of hydrocarbon fuel fed to the process, ranges from 14.7:1 to 30.0:1.

14. The process of claim 1 wherein the gaseous reformate is cooled prior to mixing with the second supply of oxidant.

15. The process of claim 1 wherein the hydrogen comprises from 18 to 25 volume percent of the total volume of gaseous reformate exiting the reformer.

16. The process of claim 1 wherein a portion of exhaust gas exiting the internal combustion engine is recycled to the reformer.

17. The process of claim 1 wherein the spark-ignited internal combustion engine comprises a two-stroke engine or a four-stroke engine.

18. A process of operating a spark-ignited internal combustion engine under steady state operating conditions, comprising:
   (a) in an on-board fuel reformer contacting a first supply of hydrocarbon fuel having an average octane number greater than 80 and a first supply of oxidant with a reforming catalyst comprising a mesh substrate having an ultra-short-channel-length and having supported thereon at least one Group VIII metal, the contacting being conducted under partial oxidation reaction conditions sufficient to produce a gaseous reformate comprising hydrogen and carbon monoxide with a reforming efficiency greater than about 75 percent relative to equilibrium;
   (b) mixing the gaseous reformate with a second supply of oxidant to form a reformate blended oxidant, wherein the gaseous reformate comprises from greater than 1 to less than 18 volume percent, based on a total volume of reformate blended oxidant; and
   (c) feeding the reformate blended oxidant from step (b) and a second supply of hydrocarbon fuel having an average octane number greater than 80 into the spark-ignited internal combustion engine, igniting the resulting mixture and maintaining combustion under steady state conditions.

19. The process of claim 18 wherein the first and second supplies of hydrocarbon fuel are each independently selected from gasoline, natural gas, methane, or a mixture thereof.

20. The process of claim 18 wherein the ultra-short-channel-length of the mesh substrate ranges from 25 microns to 500 microns.

21. The process of claim 18 wherein the mesh further comprises from 100 to 1,000 flow channels per square centimeter.

22. The process of claim 18 wherein the reformer operates at a temperature ranging from 700° C. to 1,100° C. and at an O:C ratio of oxygen atoms in the first supply of oxidant to carbon atoms in the first supply of hydrocarbon fuel ranging from 0.5:1 to 1.2:1.

23. The process of claim 18 wherein the overall air to fuel ratio, expressed as a weight ratio (g/g) of total first and second supplies of oxidant to total first and second supplies of hydrocarbon fuel fed to the process, ranges from 14.7:1 to 30.0:1.

24. The process of claim 18 wherein the gaseous reformate is cooled prior to mixing with the second supply of oxidant.

25. The process of claim 18 wherein the hydrogen comprises from 18 to 25 volume percent of the total volume of reformate exiting the reformer.

26. The process of claim 18 wherein a portion of exhaust gas exiting the internal combustion engine is recycled to the reformer.

* * * * *